United States Patent
Struye et al.

(10) Patent No.: US 8,452,069 B2
(45) Date of Patent: May 28, 2013

(54) METHOD OF ELIMINATING EFFECT OF AFTERGLOW ON RADIATION IMAGE READ OUT OF PHOTOSTIMULABLE PHOSPHOR SCREEN

(75) Inventors: Luc Struye, Mortsel (BE); Paul Leblans, Kontich (BE); Dirk Vandenbroucke, Boechout (BE)

(73) Assignee: Agfa HealthCare NV, Morstel (BE)

( * ) Notice: Subject to any disclaimer, the term of this patent is extended or adjusted under 35 U.S.C. 154(b) by 742 days.

(21) Appl. No.: 12/717,261

(22) Filed: Mar. 4, 2010

(65) Prior Publication Data

US 2010/0226557 A1 Sep. 9, 2010

Related U.S. Application Data

(60) Provisional application No. 61/158,453, filed on Mar. 9, 2009.

(30) Foreign Application Priority Data

Mar. 9, 2009 (EP) ..................................... 09154644

(51) Int. Cl.
*G06K 9/00* (2006.01)
(52) U.S. Cl.
USPC ......................................................... 382/132
(58) Field of Classification Search
USPC ......................................................... 382/132
See application file for complete search history.

(56) References Cited

U.S. PATENT DOCUMENTS

| 4,571,493 | A | | 2/1986 | Horikawa |
| 4,582,988 | A | * | 4/1986 | Aagano .......................... 250/585 |
| 4,785,183 | A | | 11/1988 | Tsuchino et al. |
| 4,800,276 | A | * | 1/1989 | Noguchi ......................... 250/586 |
| 4,916,316 | A | * | 4/1990 | Umemoto et al. ............. 250/587 |
| 5,644,610 | A | * | 7/1997 | Crawford et al. ................ 378/19 |
| 7,003,071 | B2 | * | 2/2006 | Nagaoka et al. ................. 378/19 |
| 7,570,735 | B2 | * | 8/2009 | Konno et al. ..................... 378/19 |
| 7,692,629 | B2 | * | 4/2010 | Baudisch et al. .............. 345/157 |
| 2004/0158592 | A1 | * | 8/2004 | Nikitin et al. .................. 708/400 |
| 2005/0036582 | A1 | * | 2/2005 | Nagaoka et al. ................. 378/19 |
| 2005/0047639 | A1 | * | 3/2005 | Hayashida ..................... 382/132 |
| 2006/0145593 | A1 | * | 7/2006 | Yoshino et al. ................. 313/487 |
| 2007/0297562 | A1 | * | 12/2007 | Konno et al. ..................... 378/12 |
| 2009/0154765 | A1 | * | 6/2009 | Watanabe et al. .............. 382/100 |
| 2010/0061506 | A1 | * | 3/2010 | Koehler ........................... 378/19 |
| 2010/0135455 | A1 | * | 6/2010 | Chiang ............................ 378/19 |
| 2010/0187423 | A1 | * | 7/2010 | Nakamura et al. ......... 250/361 R |

FOREIGN PATENT DOCUMENTS

JP 07 056251 A 3/1995

OTHER PUBLICATIONS

Search Report completed Nov. 2, 2009, from counterpart European Application No. EP 09 15 4644, filed on Mar. 9, 2009.

* cited by examiner

*Primary Examiner* — Luke Gilligan
*Assistant Examiner* — Robert Sorey
(74) *Attorney, Agent, or Firm* — Houston & Associates, LLP

(57) ABSTRACT

Method of eliminating the effect of afterglow on a radiation image read out of a photostimulable phosphor screen. For each pixel the amount of afterglow generated by previously scanned pixels in the same line of pixels is determined and subtracted from the digital signal representation of that pixel.

6 Claims, 2 Drawing Sheets

METHOD OF ELIMINATING EFFECT OF AFTERGLOW ON RADIATION IMAGE READ OUT OF PHOTOSTIMULABLE PHOSPHOR SCREEN

RELATED APPLICATIONS

This application claims priority to European Patent Application No. EP 09154644.0, filed on Mar. 9, 2009, and claims the benefit under 35 USC 119(e) of U.S. Provisional Application No. 61/158,453, filed on Mar. 9, 2009, both of which are incorporated herein by reference in their entirety.

BACKGROUND OF THE INVENTION

In digital radiography, an imaging technique is nowadays frequently used in which a radiation image of an object or a patient is temporarily stored in a photostimulable phosphor screen.

The radiation image can then be read out by scanning the screen with stimulating radiation and by detecting the image-wise modulated light which is emitted by the phosphor screen upon stimulation.

Stimulation can for example be performed in a flying spot scanner by scanning the phosphor screen carrying a radiation image by means of a sweeping ray of laser light. Typically a screen is pixel-wise scanned by deflecting the laser beam so that it performs a line-wise movement in a first direction parallel with one of the sides of the phosphor screen. Thereupon the screen is moved in the sub-scan direction perpendicular to the first direction in order to scan the entire surface of the phosphor screen.

When stimulating a pixel of a phosphor that was exposed to a radiation image with light having a wavelength within the phosphor's stimulating wavelength range, the pixel emits image-wise modulated light of a second wavelength. This emitted light can be detected by means of a light sensor such as a photomultiplier and converted in a corresponding electrical signal.

Frequently used stimulable phosphors include divalent europium activated phosphors (e.g., BaFBr:Eu, BaFBrI:Eu) or cerium activated alkaline earth metal halide phosphors and cerium activated oxyhalide phosphors, as well as e.g. a phosphor having the formula of YLuSiO$_5$:Ce,Zr.

Examples of suitable screens are divalent europium activated alkali halide type phosphor screens, wherein said halide is at least one of chloride, bromide and iodide or a combination thereof or divalent europium activated alkaline earth metal phosphor screens wherein said halide is at least one of fluoride, chloride, bromide and iodide or a combination thereof. Specific examples are a divalent europium activated CsX type phosphor screen, wherein said X represents Br or a combination of Br with at least one of Cl and I, as Br(Cl), Br(I) or Br(Cl,I) and a bariumfluorohalide phosphor screen wherein the phosphor is of the (Ba,M$^{II}$)FX':Eu type, wherein M$^{II}$ is an alkaline earth metal and wherein X' is Cl, Br and/or I.

Crystalline divalent europium activated alkali halide phosphor screens advantageously have CsBr:Eu$^{2+}$ storage phosphor particles, in binderless layers in the form of cylinders (and even up to a needle-shaped form) wherein said cylinder has an average cross-section diameter in the range from 1 micrometer (µm) to 30 µm (more preferred: from 2 µm up to 15 µm), an average length, measured along the casing of said cylinder, in the range from 100 µm up to 1000 µm (more preferred: from 100 µm up to 500 µm) as has e.g. been described in EP-A 1 359 204. Such block-shaped, prismatic, cylindrical or needle-shaped phosphors, whether or not obtained after milling, are, in another embodiment, coated in a phosphor binder layer.

Non-crystalline or amorphous europium activated alkaline earth metal halide phosphor screens advantageously have Ba(Sr)FBr:Eu$^{2+}$ storage phosphor particles, dispersed in a binder medium in their corresponding storage phosphor layers.

The used phosphors are characterized by an afterglow emission with low amplitude but having a decay time that is large compared to the stimulation time of a single pixel, i.e. the period of time that a single pixel is stimulated by the scanning laser.

The photo-multiplier integrates all light that is directed towards its light sensitive surface. It thus detects the image-wise modulated light emitted by an instantaneously scanned pixel as well as the afterglow light emitted by previously scanned pixels.

Depending on the ratio of the decay time of the phosphor and the time the laser light is stimulating a pixel, the number of pixels that produce an afterglow that has an influence on the total amount of light that is detected for a certain pixel, can be determined.

Typically the scanning time of one pixel is about 1 µsec whereas the decay time of the phosphor ( . . . type phosphor) is 1 to 1.4 msec. This results in the fact that the afterglow produced by a scanned pixel still has an influence on the next 1000 scanned pixels.

This results in an asymmetric deformation of the detected signal which can have negative effects on the diagnosis to be performed on an image corresponding with the detected signal.

The negative effect can for example be seen on an image of a breast phantom such as the Thormamm phantom. The after glow of pixels outside the phantom image that were scanned prior to the pixels pertaining to the breast phantom have an influence on the pixels of the phantom, they increase the read out signal at the border of the phantom resulting in a lighter part in the image reproduction (hard copy image or displayed image). This phenomenon may have negative consequences on the diagnosis.

Also a lead-mark phantom positioned in the irradiated zone causes a line image to appear in the actual image.

SUMMARY OF THE INVENTION

It is an aspect of the present invention to overcome the above-described problem.

The present invention concerns digital radiography and more particularly relates to a method for eliminating the deteriorating effect of after glow on an image that was temporarily stored in a photostimulable phosphor and that was read out of the phosphor by line-wise scanning it by means of laser light and converting the light emitted upon scanning into an electric signal.

In general, according to one aspect, the invention features, a method of reading a radiation image that has been stored in a photostimulable phosphor screen comprising line-wise scanning the phosphor screen by means of a deflected laser beam so as to stimulate the phosphor carrying the radiation image, converting image-wise modulated light emitted by the phosphor screen upon stimulation into an electric signal representation, for each pixel determining the amount of afterglow generated by previously scanned pixels in the same line of pixels, for each pixel subtracting the determined amount of afterglow from the electric signal representation in the pixel.

The afterglow is equal to $$\sum e^{-t/tau} \cdot f(t)$$

wherein tau represents the time constant of the afterglow and f(t) represents the amount of emitted light as a function of time during scanning and $$\sum$$

is a summation for all pixels scanned prior to a pixel of interest and the afterglow in pixel (i+1) is determined as $$\text{Afterglow}(i+1) = \frac{\text{Pixel}(i+1) * tau + \text{afterglow}(i)}{1 + tau},$$

and wherein Afterglow (i+1) is multiplied with a constant value Amp, and subtracted from the instantaneous pixel value.

In embodiments, the afterglow values are determined at the same temperature as the temperature at which the phosphor screen is read out.

Also, the digital signal is preferably filtered with one or more low pass filters of the first order, having characteristics so that the response of the filter(s) to a Dirac function has a time constant Tau and amplitude Amp that corresponds with the time constant and the intensity of the afterglow of the phosphor, to obtain a low pass filtered signal and wherein the low pass filtered signal is subtracted from the digital signal.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
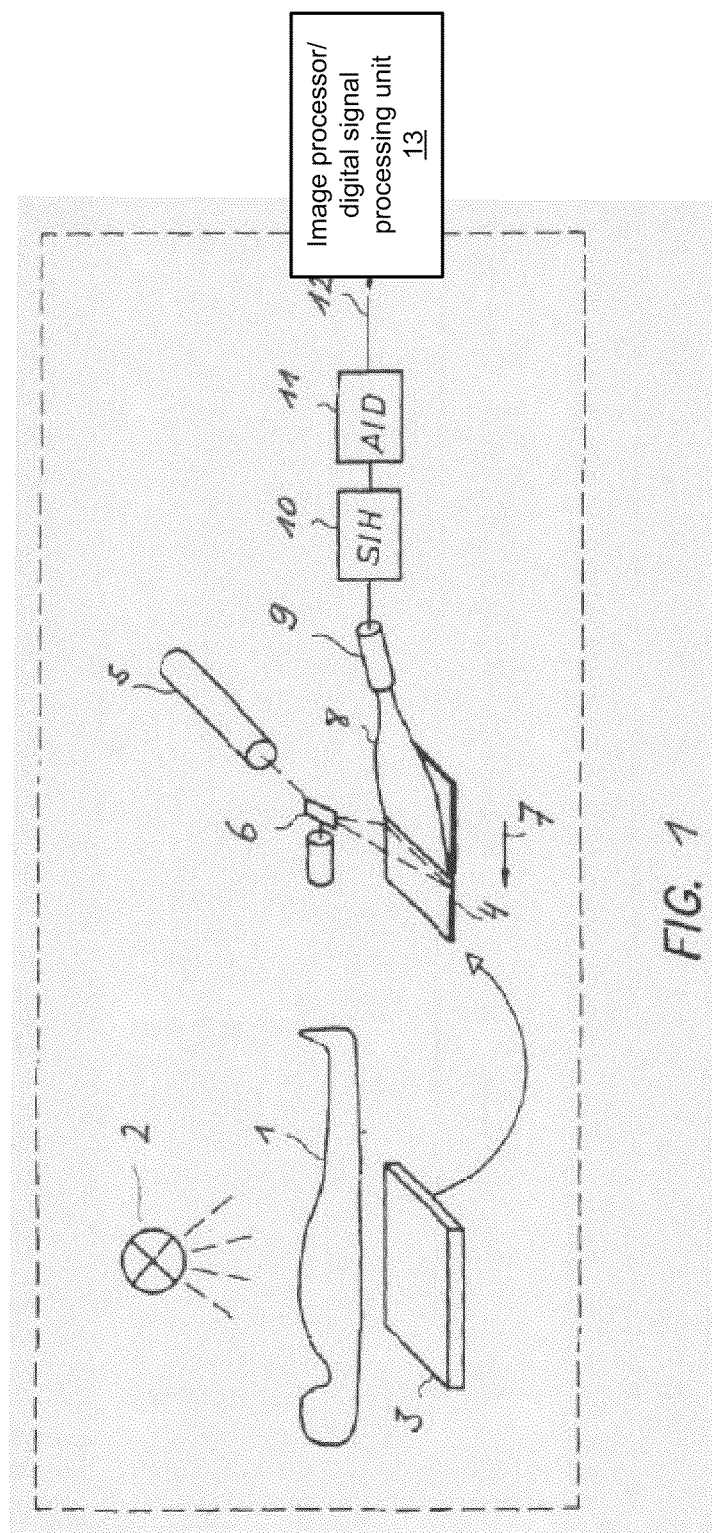
FIG. 1 is a schematic diagram of a flying spot scanner.

A simplified diagram of an apparatus wherein the after glow is detected is shown in FIG. 1.

A radiation image of an object or a patient 1 is recorded onto a photostimulable phosphor screen by exposing the screen to x-rays originating from an x-ray source 2 and transmitted through the object or the patient.

The photostimulable phosphor screen 4 is conveyed in a cassette 3. In a radiation image read out apparatus the latent image stored in the photostimulable phosphor screen 4 is read out by scanning the phosphor screen with stimulating rays emitted by a laser 5. The stimulating rays are deflected in the main scanning direction (for example from left to right) by means of a galvanometric deflection device 6. The secondary scanning motion is obtained by transporting the phosphor screen in a direction (direction of arrow 7) perpendicular to the main scanning direction. A light collector 8 directs the light obtained by stimulated emission onto a photomultiplier 9 where it is converted into an electric signal which is next sampled by a sample and hold circuit 10 and converted into a 12-bit digital signal by means of an analog to digital converter 11. From there the digital signal can be sent (arrow 12) to an image processor 13, which typically includes a digital signal processing unit.

The signal that is detected by the photomultiplier is for each pixel includes a part corresponding with the stimulated emission of that pixel as well as a part that originates from the after glow of previously scanned pixels.

The signal generated by the afterglow of already scanned pixels in the same line will be subtracted from the instantaneous pixel value of a pixel using the image processor 13.

Software Solution

In a first embodiment the afterglow is determined and eliminated by means of a filtering system implemented using a software solution. In the software solution, the afterglow values are determined and the subtraction is performed in the digital signal processing unit 13.

In order to determine the afterglow signal which is to be taken into account for a certain pixel under evaluation, a summation is made of the afterglow produced by the pixels in the same line that were read out (stimulated) previously.

The afterglow originating from a single pixel can be defined as follows:

$$\text{Afterglow} = \text{Pixel\_value} * e^{-t/tau}$$

wherein t represents the time period between the stimulation of the current pixel under evaluation and the stimulation of the pixel that has generated the afterglow, and tau is a time constant.

The value tau is typically 1 to 1.4 msec. Since on average the laser beam stimulates a pixel of the phosphor screen during 1 μsec, the after glow of about 1000 previously scanned pixels influences the read out value at a pixel under evaluation.

The total amount of afterglow generated by all pixels in the same line that were previously scanned is then given by $$\text{Afterglow\_all} = \sum e^{-t/tau} \cdot f(t) \backslash$$

wherein tau is a time constant and f(t) is the signal generated by the photomultiplier by detecting the photostimulated emitted light.

In order to determine the afterglow by a large amount of pixels a lot of exponential values have to be calculated. Since this is highly time consuming, the moving average algorithm is preferably applied.

This algorithm is a recursive algorithm whereby the after glow in pixel i+1 is determined by the following formula:

$$\text{Afterglow}(i+1) = \frac{\text{Pixel}(i+1) * tau + \text{afterglow}(i)}{1 + tau}$$

In one implementation, the calculated value for the afterglow is multiplied with a constant value, further on referred to as Amp, and subtracted from the instantaneous pixel value.

Two arrays can be envisaged, one array comprising the read out pixel values in each of the pixels of a scanned line, the other array comprising the afterglow values for each pixel, the afterglow values originating from afterglow of previously scanned pixels and being determined by means of the moving average algorithm described higher.

For each pixel the afterglow value multiplied by a constant is subtracted from the read out pixel value.

In an alternative embodiment the formula for the afterglow can also be described as follows:

$$\text{Afterglow}(I+1) = (\text{Afterglow}(I) + \alpha \cdot S))\beta \text{ whereby}$$

$$\frac{1}{1 + tau} = \beta$$

and $$\alpha = tau \times amp$$

S is the read out signal value in a pixel.

The constant values tau and Amp in both formulae can be determined as follows.

A photostimulable phosphor screen that is partially, e.g. half, covered with radiation blocking material is subjected to a uniform illumination. The screen is then scanned and the read out signal is detected and digitized. For each line the signal should theoretically attain a constant value in the uncovered region and become zero in the region that is blocked from being irradiated.

However, due to afterglow the signal in the covered area does not become zero but has an exponentially decreasing path.

From the read out image signal, signals representing several lines are extracted and averaged.

Then, using the above described moving average algorithm with a preset tau value and preset Amp value, the corresponding theoretical profile is calculated.

Then a fitting procedure (e.g. Newton Raphson approximation) is applied to the theoretical and the read out profile so as to obtain optimal values for tau and Amp.

It is possible that the used phosphor generates after glow with different time constants. In this case, the method is applied several times with different values of Tau and Amp whereby the results of every step are superposed, in one embodiment.

The after glow values may be temperature dependent so preferably the afterglow values are determined at the same temperature value as the temperature of the photostimulable phosphor screen carrying the image to be corrected for after glow.

Under other conditions, the after glow behavior may not only be dependent on temperature but also on other characteristics such as laser power, phosphor characteristics, screen characteristics etc. In such cases, the afterglow values are determined on the fly when reading an image from an exposed phosphor screen so that the conditions under which the after glow values are determined are equal to the conditions under which the actual image to be corrected is read out from the screen.

To determine the after glow values on the fly, a part of the screen, preferably outside the image area, is covered by radiation blocking material, e.g. a lead strip. When the screen is exposed to a radiation image and read out, several types of lines are read out. Most lines belong to the actual radiation image, other lines are read that have partially received non-modulated radiation (outside the image area) and partially received no radiation (blocked area). The area that received non-modulated radiation, will generate afterglow on the part that was blocked from radiation by the radiation blocking area. The signals corresponding with image lines pertaining to this area are used as input for the regression or fitting algorithm described higher.

Since the area which is used for determining the after glow signal and the actual image area are read out under the same environmental conditions, the above-enumerated influencing factors (temperature, laser power etc.) are eliminated.

In a second embodiment to determine the after glow values on the fly, the signal detected in the area outside the photostimulable phosphor screen were the laser is still scanning (since the scanning movement of the laser extends beyond the screen area) is used to calculate the after glow values using the above-described fitting procedure. This embodiment required fast calculation since the calculation is to be terminated before the end of the laser retrace period.

Hardware Solution

In a second embodiment the afterglow is determined and eliminated by means of a hardware filter system as described below.

Figure 2:
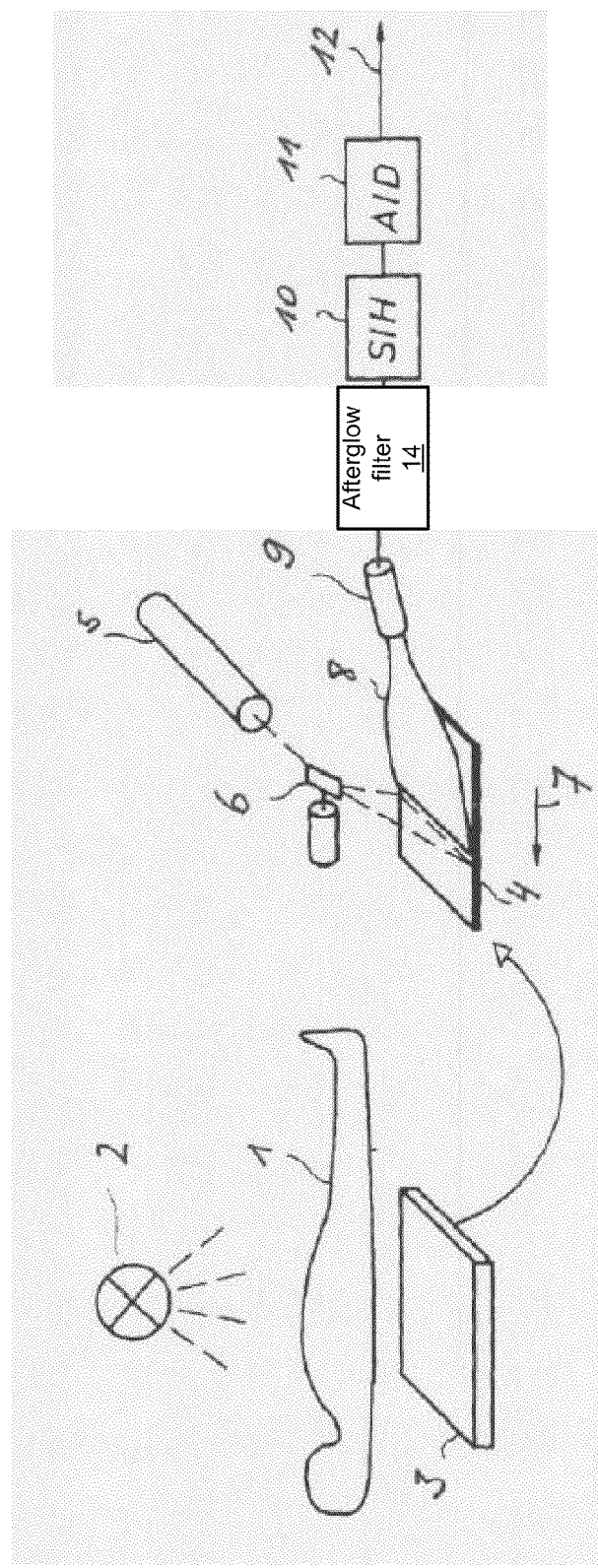
FIG. 2 is a schematic diagram of a flying spot scanner according to another embodiment.

In more detail, a simplified diagram of an apparatus wherein the after glow is filtered using a hardware filter is shown in FIG. 2.

The radiation image of an object or a patient 1 is recorded onto a photostimulable phosphor screen by exposing the screen to x-rays originating from an x-ray source 2 and transmitted through the object or the patient.

The photostimulable phosphor screen 4 is conveyed in a cassette 3. In a radiation image read out apparatus the latent image stored in the photostimulable phosphor screen 4 is read out by scanning the phosphor screen with stimulating rays emitted by a laser 5. The stimulating rays are deflected in the main scanning direction (for example from left to right) by means of a galvanometric deflection device 6. The secondary scanning motion is obtained by transporting the phosphor screen in a direction (direction of arrow 7) perpendicular to the main scanning direction. A light collector 8 directs the light obtained by stimulated emission onto a photomultiplier 9 where it is converted into an electric signal. The signal is then filtered by an afterglow filter 14. The output of the filter 14 is next sampled by a sample and hold circuit 10 and converted into a 12 bit digital signal by means of an analog to digital converter 11. From there the digital signal can be sent (arrow 12) to an image processor, which typically includes a digital signal processing unit.

The afterglow filter 14 includes one or more low pass filter(s) of the first order with time constant tau. Basically a low pass filter of the first order can be made with a resistance and a capacitor or with a resistance and a coil. However to enhance the characteristics of the filter one or more operational amplifiers are preferably used. The time constant (Tau) and the gain (amp) of the filter is adjustable by changing the values of the capacitor or the resistances R1 and R2. The values for these components are chosen so that the time constant and gain of the filter 14 fits with the characteristics of the afterglow.

The characteristics of the first order filter are such that the response of the filter(s) to a Dirac function has a time constant tau and amplitude Amp that corresponds with the time constant and the intensity of the afterglow of the phosphor.

The above described system can also be used to eliminate flare effects due to optical reflections or radiation scattering e.g. by a phantom.

A signal originating from flare typically has an exponentially increasing path in front of the flare inducing element and an exponentially decreasing path behind the flare inducing element (if it is assumed that the direction of the laser beam is from the front of the flare inducing element to the back of the flare inducing element).

This signal, in this case, is preferably divided in two parts which are mirrored versions of each other.

An array of correction values for the first part are then calculated by applying the above-described procedure since the signal path of this first signal part is similar to that of an after glow signal. The other part is a mirrored version of the first part. The correction values for this second part are calculated by applying the afterglow algorithm in the reverse sense (reverse to the scanning direction) or by applying the array of calculated correction values in the other sense (reverse to the scanning direction).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of eliminating the deteriorating effect of afterglow in a radiation image of a patient that has been stored in a photostimulable phosphor screen comprising:
    line-wise scanning a phosphor screen with a deflected laser beam so as to stimulate a recorded phosphor radiation image of a patient;
    converting, by a photomultiplier, image-wise modulated light emitted by said phosphor screen upon stimulation into an electric signal representation, wherein the electric signal representation includes parts corresponding to an instantaneous pixel value and an afterglow of previously scanned pixels;
    determining, by the image processor, for each pixel of the electric signal representation, the amount of afterglow generated by all previously scanned pixels in the same line of pixels prior to an instantaneous pixel, wherein said amount of afterglow is equal to $\Sigma e^{-t/tau} \cdot f(t)$, where tau is the time constant of the afterglow, f(t) is the amount of emitted light as a function of time during scanning, and $\Sigma$ is the summation for all pixels in the same line that were scanned prior to the instantaneous pixel;
    multiplying, by an image processor, for each pixel of the electric signal representation, each determined amount of afterglow with a constant amplitude (Amp) value, wherein the constant amplitude value is an optimal value obtained through a fitting procedure applied to a preset amplitude value;
    subtracting, by the image processor, for each pixel of the electric signal representation, said determined amount of afterglow multiplied by said constant amplitude (Amp) value from $\Sigma e^{-t/tau} \cdot f(t) \Sigma$ $$Afterglow(i+1) = \frac{Pixel(i+1) * tau + afterglow(i)}{1 + tau},$$

the instantaneous pixel value.

2. A method according to claim 1, wherein said afterglow values are determined at the same temperature as the temperature at which said phosphor screen is scanned.

3. A method according to claim 1, wherein said electric signal is filtered with one or more low pass filters of the first order, having characteristics so that the response of the one or more filters to a Dirac function has a time constant, tau, and an amplitude, Amp, that correspond with the time constant and the intensity of the afterglow of the phosphor, to obtain a low pass filtered signal, and wherein said low pass filtered signal is subtracted from said electric signal.

4. A filtering system configured to eliminate the deteriorating effect of afterglow in a radiation image of a patient that has been stored in a photostimulable phosphor screen comprising:
    a scanner configured to line-wise scan a phosphor screen with a deflected laser beam so as to stimulate a recorded phosphor radiation image of a patient;
    a photomultiplier configured to convert an image-wise modulated light emitted by said phosphor screen upon stimulation into an electric signal representation, wherein the electric signal representation includes parts corresponding to an instantaneous pixel value and an afterglow of previously scanned pixels;
    an image processor configured to, for each pixel of the electric signal representation, determine the amount of afterglow generated by previously scanned pixels in the same line of pixels prior to an instantaneous pixel, wherein said amount of afterglow in pixel (i+1) prior to the instantaneous pixel is determined as $$Afterglow(i+1) = \frac{Pixel(i+1) * tau + afterglow(i)}{1 + tau},$$

where tau is the time constant of the afterglow;
    an image processor configured to multiply, for each pixel of the electric signal representation, each determined amount of afterglow with a constant amplitude (Amp) value, wherein the constant amplitude value is an optimal value obtained through a fitting procedure applied to a preset amplitude value;
    the image processor configured to, for each pixel of the electric signal representation, subtract said determined amount of afterglow multiplied by said constant amplitude (Amp) value from $\Sigma e^{-t/tau} \cdot f(t) \Sigma$ $$Afterglow(i+1) = \frac{Pixel(i+1) * tau + afterglow(i)}{1 + tau}$$

the instantaneous pixel value.

5. A system according to claim 4, wherein said afterglow values are determined at the same temperature as the temperature at which said phosphor screen is scanned.

6. A system according to claim 4, wherein said filtering system comprises one or more low pass filters of the first order, having characteristics so that the response of the one or more filters to a Dirac function has a time constant, tau, and an amplitude, Amp, that correspond with the time constant and the intensity of the afterglow of the phosphor, to obtain a low pass filtered signal, and wherein said low pass filtered signal is subtracted from said electric signal.

* * * * *